May 6, 1941.      H. F. LEESEBERG      2,240,791
APPARATUS FOR DISPENSING CARBONATED BEVERAGES
Filed July 16, 1940
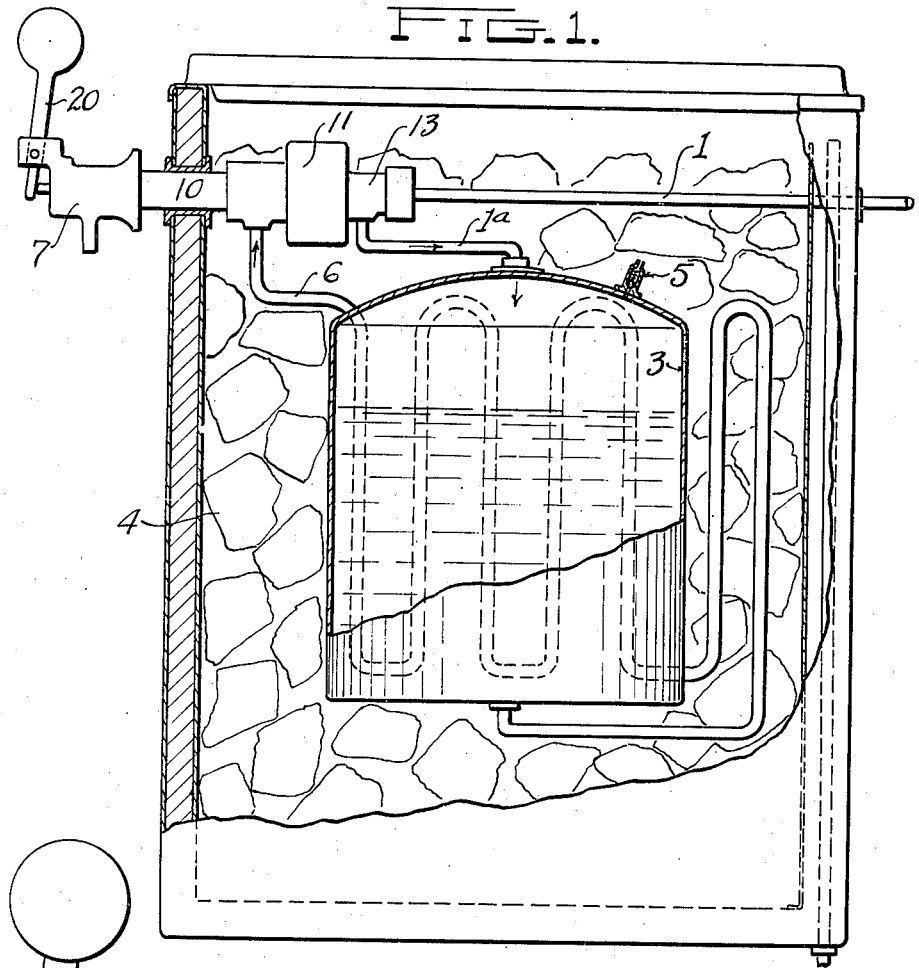
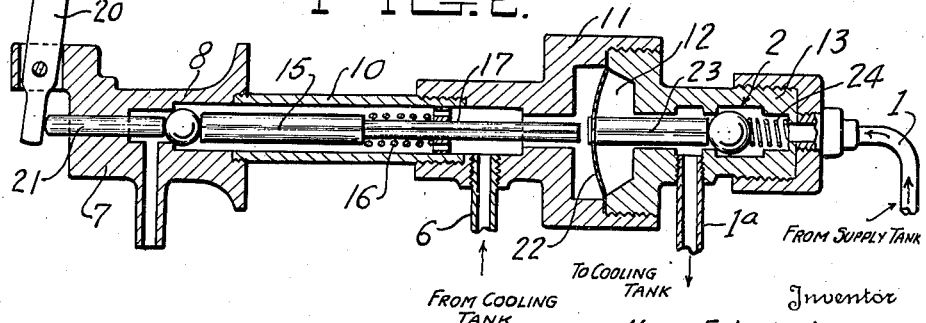
Inventor
Harry F. Leeseberg
By Owen & Owen
Attorneys Patented May 6, 1941

2,240,791

UNITED STATES PATENT OFFICE 2,240,791

APPARATUS FOR DISPENSING CARBONATED BEVERAGES

Harry F. Leeseberg, Cleveland, Ohio

Application July 16, 1940, Serial No. 345,751

5 Claims. (Cl. 225—24)

This invention relates to apparatus for dispensing carbonated beverages, and particularly gingerale and root beer, which are under high pressure at the supply source. This high pressure makes it very difficult to draw the beverage without a sputtering action and without obtaining a very objectionable knocking or hammering of the main valve when initially opened.

The primary object of the invention is the provision of a dispensing apparatus of this character which will obviate the above-noted objections.

A further object of the invention is the provision in a dispensing apparatus of this character having cooperating high and low pressure discharge valves of a single operating means therefor providing a lost motion connection therebetween and operable to effect a partial opening of the low pressure discharge valve before the high pressure valve controlling the flow of material from the supply source is opened, thereby preventing the sputtering discharge from the draw faucet and the hammering action commonly incident to the use of such apparatus.

Other objects and advantages of the invention will be apparent from the following detailed description and from the accompanying drawing illustrating one embodiment of the invention, in which—

Figure 1 is a fragmentary elevation, partly in section, of an apparatus embodying the invention, and Fig. 2 is an enlarged longitudinal sectional detail of the portion of the apparatus in which the invention particularly resides.

Referring to the drawing, 1 designates a supply conduit leading from a tank or other source of supply of the beverage to be dispensed and in which the beverage, particularly in the case of gingerale and root beer, is maintained under a pressure of from 150 to 200 pounds. The supply conduit 1 leads through a main normally closed valve 2 to a cooling and pressure reducing tank 3, which in the present instance is shown as disposed in a cooling chamber 4 with ice packed therearound. The pressure in the tank 3 is reduced the desired extent, usually to six or eight pounds pressure, in any suitable manner, which in the present instance is accomplished by the use of a pressure relief valve 5 on the tank. The discharge from the tank is through a conduit 6, which in the present instance is shown as looped backward and forward within the cooling chamber 4, and this conduit leads to a faucet 7, the immediate discharge from which is controlled by a valve 8. The feature of the invention resides primarily in the manner of control of the main or high pressure valve 2 and the discharge or low pressure valve 8.

In the present embodiment of the invention, the faucet 7 is carried by a tube 10 which connects the faucet to a body member 11 forming a diaphragm chamber 12, and which body at its opposite side has an extension 13 in which the high pressure valve 2 is disposed. The supply conduit 1 leads into the part 13 at the high pressure side of the valve 2, while the conduit 1ª leading to the low pressure tank 3 extends from said part 13 at the outer side of the valve 2. The outlet conduit 6 from the tank 3 preferably has communication with the conduit 10 through a coupling connection with the adjacent side of the member 11. The conduit 10 and valve 2, in the present embodiment of the invention, are in alignment with the valve 8 for the purpose hereinafter described.

The movable member of the valve 8, which in the present instance is a ball, is held seated by a stem 15 which is acted on by a coiled compression spring 16. This stem is disposed in the conduit 10 and its spring acts against a guide 17 therein, which is perforated or provided with openings to permit the flow of material through the conduit. The inner end of this stem extends into the adjacent side of the diaphragm chamber 12. The valve is unseated by the manipulation of a control lever 20 which acts against a stem 21 slidingly mounted in the faucet 7 and bearing at its inner end against the adjacent side of the valve member, so that an inward movement of the stem will effect an unseating of the valve against the action of the spring pressed stem 15.

A diaphragm 22 is disposed in the chamber 12 and has a stem 23 attached to and projecting from the opposite side thereof to the stem 15 and in engagement at its opposite end with the ball or movable valve member of the main valve 2. This valve is normally held seated by a coiled expansion spring 24 which acts through the valve on the stem 23 to normally retain the diaphragm 22 bellied outwardly toward the stem 15, as shown. Such bellying may also be effected by pressure escaping into the adjacent side of the diaphragm chamber from the high pressure line. The stem 15, when its valve 8 is seated, terminates in slightly spaced relation to the diaphragm 22 or adjacent end of the stem 23, so as to provide a slight lost motion action therebetween.

It is apparent, in an operation of the apparatus, that both valves 2 and 8 are opened by an inward movement of the stem 21 and that the initial opening of the valve 8 precedes that of the valve 2 due to the lost motion feature between the stems 15 and 23. In other words, when operating the faucet to effect a beverage discharge, the valve 8 is first opened a predetermined extent so that discharge from the cooling tank 3 begins to take place before the high pressure valve 2 is opened. This action not only prevents a sputtering discharge from the faucet when first opened, but also prevents the hammering or pounding action of the valve 2 during the initial opening and discharge of liquid from the faucet which, so far as I am aware, is a feature incident to beverage dispensing apparatus of this character now on the market.

It is also found that by reason of the use of the diaphragm 22 in the chamber 12, the space between the two valves, except through the cooling chamber, is hermetically sealed, thus preventing escape of high pressure gas or fluid along the valve stems between the two valves.

A further advantage of the present construction resides in the fact that a slow discharge of liquid from the cooling tank may be effected by a slight opening of the valve 8 without effecting an opening of the high pressure valve 2. This is sometimes desirable but not necessary to maintain a low pressure in the cooling tank, as it is found in practice that the escape of pressure from the tank 3 is sufficiently rapid to take care of the high pressure liquid discharging therein from the supply line under ordinary service conditions.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an apparatus of the class described in which a liquid under high pressure is supplied to a discharge faucet through a pressure reducing medium, two valves seating in the direction of liquid flow, one between the supply source and pressure reducing medium and one between said medium and the faucet outlet, and means operable to open both said valves and having a lost motion connection causing a predetermined opening of said latter valve in advance of an opening of the other valve.

2. In an apparatus of the class described in which a liquid under high pressure is supplied to a discharge faucet through a pressure reducing medium, a high pressure valve and a low pressure valve seating in the direction of liquid flow, the former between the supply source and pressure reducing medium and the latter between said medium and faucet outlet, said valves being normally held seated, a lost motion connection between said valves operable to communicate an opening movement from the low pressure to the high pressure valve after the low pressure valve has opened a predetermined extent, and means manually operable upon said low pressure valve.

3. In an apparatus of the class described in which a liquid under high pressure is supplied to a discharge faucet through a pressure reducing medium, two valves seating in the direction of liquid flow and aligned substantially one with another, one forming a high pressure valve between the supply source and pressure reducing medium and the other forming a low pressure valve between said medium and the faucet outlet, said valves being normally seated, separate stems in engagement with said valves and movable to effect an opening thereof, a third stem interposed between the low pressure valve and the stem of the high pressure valve and having lost motion connection therewith and operable upon an opening of the low pressure valve to first take up said lost motion and then impart valve opening movements to the high pressure valve stem, the stem of said low pressure valve being operable from without the faucet to effect an opening of its valve.

4. In an apparatus of the class described in which a liquid under high pressure is supplied to a discharge faucet through a pressure reducing medium, a high pressure and a low pressure valve seating in the direction of liquid flow, one between the supply source and pressure reducing medium and the other between said medium and the faucet discharge outlet, said valves being normally seated, means including a diaphragm interposed between said valves and operable to open the high pressure valve, a lost motion connection between said low pressure valve and means, means operable by an opening movement of the low pressure valve to first take up said lost motion and then to operate said first means to open the high pressure valve, and means operable to open the low pressure valve.

5. In an apparatus of the class described in which a liquid under high pressure is supplied to a discharge faucet through a pressure reducing medium, means forming a part of the connection between the high pressure supply source and faucet and including a diaphragm chamber and two valve seats at opposite sides of said chamber, one at the supply side of said medium and the other at the discharge side thereof, a valve normally seating against each seat to close the respective line, a diaphragm in said chamber closing the communication between opposite sides thereof and having a projection for acting against the valve in the high pressure side of the line to open it when the diaphragm is moved from normal position, a lost motion connection between the valve in the low pressure side of the line and said diaphragm operable by an opening movement of said low pressure valve to first take up the lost motion and then to actuate the diaphragm and its projection to open the other valve, and means operable to open the valve in the low pressure side of the line.

HARRY F. LEESEBERG.